United States Patent [19]
Wolfe et al.

[11] Patent Number: 5,968,680
[45] Date of Patent: Oct. 19, 1999

[54] HYBRID ELECTRICAL POWER SYSTEM

[75] Inventors: Dave Wolfe, San Pedro; Nguyen Minh, Fountain Valley, both of Calif.; Kurt Meister, Apache Junction, Ariz.; Dan Matulich, Rolling Hills Estates, Calif.

[73] Assignee: AlliedSignal, Inc., Morristown, N.J.

[21] Appl. No.: 08/926,617

[22] Filed: Sep. 10, 1997

[51] Int. Cl.⁶ .............................. H01M 8/04; H01M 8/06
[52] U.S. Cl. ................................ 429/13; 429/17; 429/20; 429/22; 429/23; 429/26
[58] Field of Search .................... 429/26, 12, 13, 429/23, 22, 20, 24, 17

[56] References Cited

U.S. PATENT DOCUMENTS

| | | | |
|---|---|---|---|
| 3,336,162 | 8/1967 | Zachmann | 136/86 |
| 3,607,427 | 9/1971 | White . | |
| 5,082,752 | 1/1992 | Koga et al. | 429/20 |
| 5,208,114 | 5/1993 | Uematsu | 429/20 |
| 5,413,879 | 5/1995 | Domeracki et al. | 429/30 |
| 5,482,791 | 1/1996 | Shingai et al. | 429/23 |
| 5,541,014 | 7/1996 | Micheli et al. | 429/19 |
| 5,678,647 | 10/1997 | Wolfe et al. | 180/65.3 |
| 5,811,201 | 9/1998 | Skowronski | 429/17 |

FOREIGN PATENT DOCUMENTS

| | | |
|---|---|---|
| 400701 | 12/1990 | European Pat. Off. . |
| 19618121 | 11/1997 | Germany . |
| 63-29459 | 2/1988 | Japan . |
| 3-286150 | 12/1991 | Japan . |
| 8-45523 | 2/1996 | Japan . |
| WO 9605625 | 2/1996 | WIPO . |
| WO 9728573 | 8/1997 | WIPO . |
| WO 9827004 | 6/1998 | WIPO . |

OTHER PUBLICATIONS

M. Krumpelt et al., "Systems analysis for high temperature fuel cells", 1046b Extended Abstracts (Oct. 1987).

*Primary Examiner*—Maria Nuzzolillo
*Assistant Examiner*—Jonathan Crepeau
*Attorney, Agent, or Firm*—Robert Desmond, Esq.

[57] ABSTRACT

A hybrid electrical power system includes a solid oxide fuel cell and a turbomachine. Fuel flow to the turbomachine is increased in response to demands for boost power, whereby the turbomachine's electrical generator provides the boost power. The turbomachine supplies heated, high pressure air to the solid oxide fuel cell, bringing the solid oxide fuel cell to its required operating temperature. Waste from the solid oxide fuel cell, including exhaust air and unreacted fuel, is utilized by the turbomachine.

20 Claims, 2 Drawing Sheets

HYBRID ELECTRICAL POWER SYSTEM

BACKGROUND OF THE INVENTION

The invention relates to electrical power generation.

Solid oxide fuel cells are extremely efficient generators of electricity. Within a typical solid oxide fuel cell, hydrogen gas and heated air are electrochemically reacted to generate electricity. Thermal efficiencies have been known to approach sixty percent. The byproduct of the electrochemical reaction is water. Thus, not only are fuel cells efficient generators of electricity, they are very clean generators of electricity.

Despite these advantages, solid oxide fuel cells have their limitations for certain applications. For example, solid oxide fuel cells cannot satisfy immediate demands for power. Therefore, they alone cannot provide power to systems such as electric vehicles, which require boost power during acceleration. Solid oxide fuel cells also waste thermal energy. The electrochemical reaction inside the fuel cell heats the air to temperatures of about 800° C. In many cases exhaust air from the solid oxide fuel cell is cooled, but heat removed from the exhaust air is not used efficiently.

SUMMARY OF THE INVENTION

An electrical power system comprises a solid oxide fuel cell; a turbomachine including an electrical machine; a valve for regulating a flow of fuel to the turbomachine; and a control for commanding the valve to vary the flow of fuel in response to a command for a variation in a system parameter. The flow of fuel to the turbomachine is varied to provide a controlled electrical output from a combination of the solid oxide fuel cell and the electrical machine.

A method of operating a fuel cell and a turbomachine comprises the steps of operating the solid oxide fuel cell; operating the turbomachine; combining output voltages of the solid oxide fuel cell and the turbomachine; and increasing fuel flow to the turbomachine in response to a request for boost power. By increasing the fuel flow, the turbomachine provides the requested boost power.

DETAILED DESCRIPTION OF THE INVENTION

Figure 1:
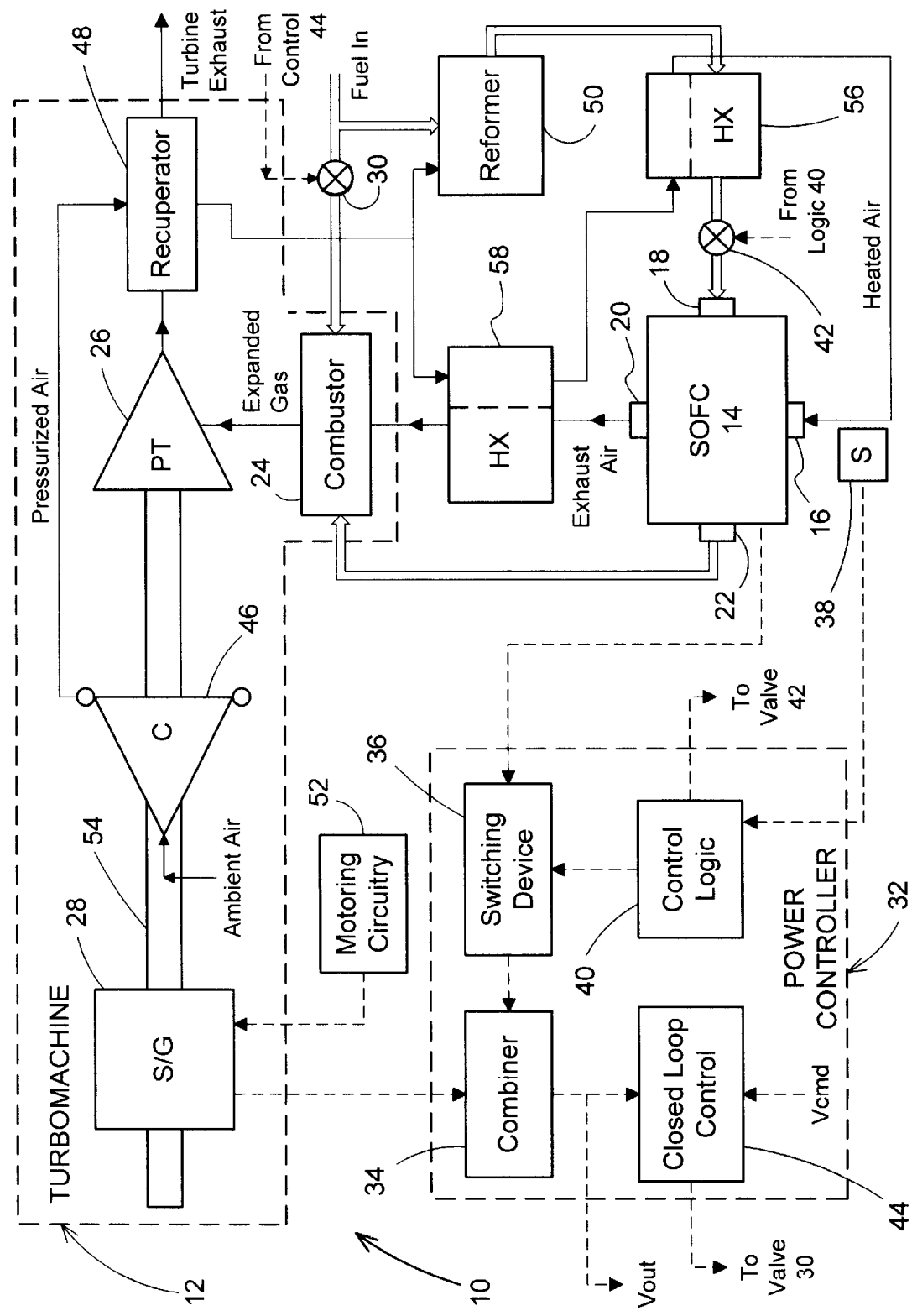
FIG. 1 is a block diagram of a hybrid electrical power system according to the present invention.

FIG. 1 shows a hybrid electrical power system 10 including two sources of electrical power: a turbomachine 12 and a solid oxide fuel cell ("SOFC") 14. The SOFC 14 includes a stack of individual cells. Each individual cell includes anode material which defines passageways for a fuel, cathode material which defines passageways for an oxidant, and a solid electrolyte which separates the anode and cathode material. During operation, heated air is supplied to an oxidant inlet 16 of the SOFC 14, and a fuel such as hydrogen gas is supplied to a fuel inlet 18 of the SOFC 14. The heated air and hydrogen gas are distributed to the oxidant and fuel passageways of the individual cells and electrochemically reacted therein, causing electrical charges to build up on the anodes and cathodes. Voltage of the SOFC 14 is determined by the number of individual cells in the stack, and amperage rating is determined by the surface area of the anodes and cathodes. Air exhaust leaves the SOFC 14 from an oxidant outlet 20, and uncombusted fuel and byproducts of the electrochemical reaction leave the SOFC 14 from a fuel outlet 22.

Examples of the SOFC 14 are disclosed in the following U.S. Patents, all of which are assigned to the assignee of the present invention: U.S. Pat. Nos. 4,913,982; 5,256,499; 5,342,705; and 5,460,897. These solid oxide fuel cells are operated at temperatures between 600° C. and 800° C. For 800° C. operation, the heated air supplied to the oxidant inlet 16 has a temperature between 600° C. and 700° C., and exhaust air at the oxidant outlet 20 has a temperature of approximately 800° C. These solid oxide fuel cells are compact and light, and capable of generating one killowatt per kilogram. They use solid-phase electrolytes, which are free of corrosion and electrolyte management problems. It should be noted, however, that solid oxide fuel cells having different designs and operating at higher temperatures could be used.

The turbomachine 12 includes a combustor 24, a power turbine 26 and an electrical machine 28. The combustor 24 ignites a mixture of hydrocarbon fuel and air to produce a hot, expanding gas. The supply of hydrocarbon fuel to the combustor 24 is regulated by a turbomachine fuel valve 30. After leaving the combustor 24, the hot gas is expanded in the power turbine 26 to generate shaft power. The shaft power drives a rotor of the electrical machine 28 to generate electricity. In an electrical machine 28 having a permanent magnet rotor and stator windings, an alternating current is induced in the stator windings when the rotor is driven by the shaft power. One example of such an electrical machine is disclosed in the assignee's U.S. Pat. No. 5,455,470.

A power controller 32 includes a combiner 34 for combining the ac voltage from the turbomachine 12 with the dc voltage from the SOFC 14 into a single output voltage Vout. For example, such a combiner 34 could include an op amp for adding the dc voltage to the ac voltage. The combiner 34 could further include a transformer, a rectifier and an inverter for changing the combined voltage to a new frequency ac voltage. It should be noted, however, that other architectures could be used for combining the dc and ac voltages. The power controller 32 also includes a switching device 36 for connecting and disconnecting the SOFC 14 from the combiner 34. Only the turbomachine 12 contributes electrical power when the SOFC 14 is disconnected from the combiner 34, and both the turbomachine 12 and the SOFC 14 contribute electrical power when the SOFC 14 is connected to the combiner 34. The power controller 32 further includes a temperature sensor 38 and control logic 40 for determining when the air supplied to the oxidant inlet 16 has reached the operating temperature of the SOFC 14. Once the operating temperature has been reached, the control logic 40 commands an SOFC fuel valve 42 to allow fuel to flow to the fuel inlet 18 of the SOFC 14. Then the control logic 40 commands the switching device 36 to connect the SOFC 14 to the combiner 34.

The power controller 32 also includes a closed loop control 44 for controlling the turbomachine fuel valve 30 according to a system parameter such as voltage. When boost power is commanded, the control 44 receives a voltage command Vcmd, compares the voltage command Vcmd to the output voltage Vout, and generates a command for the turbomachine fuel valve 30 to increase the flow of fuel to the combustor 24. As the fuel flow is increased, the electrical machine 28 increases the output voltage Vout. Either the speed of the turbomachine 12 is increased, in which case the electrical machine 28 spins faster, or inlet temperature of the turbomachine 28 is increased, in which case a temperature drop across the turbomachine 28 is increased and phase angle of the electrical machine 28 (if a (constant speed machine) is shifted. When the output voltage Vout reaches the commanded voltage, the flow of fuel to the turbomachine is maintained. When boost power is no longer needed and a new voltage command is received, the fuel flow is reduced until the output voltage reaches the commanded voltage. Feedback for the closed loop control 44 could be provided by a sensor measuring the output voltage Vout. In the alternative, feedback for the control 44 could be provided by a sensor measuring the speed of the turbomachine or a sensor measuring the inlet temperature of the turbomachine 28.

Certain efficiencies are realized by the combination of the turbomachine 12 and the SOFC 14. The turbomachine 12 uses its compressor 46 and a recuperator 48 to supply the heated air to the oxidant inlet 16 of the SOFC 14. Ambient air entering the compressor 46 is pressurized and supplied to the recuperator 48, which is located downstream the power turbine 26. During operation of the turbomachine 12, a power turbine exhaust stream leaves the power turbine 26 and flows over the recuperator 48. The recuperator 48 lowers both the noise and temperature of the exhaust stream leaving the power turbine 26. The recuperator 48 also transfers heat from the power turbine exhaust stream to the pressurized air from the compressor 46, eventually raising the temperature of the pressurized air to near that of the power turbine exhaust stream. Thus, the recuperator 48 recovers heat from the power turbine exhaust stream and uses the recovered heat to heat the air supplied to the oxidant inlet 16 of the SOFC 14. In addition to conserving energy, such use of the recuperator 48 eliminates the need for a fuel cell heater for the SOFC 14. An example of a recuperator 48, which is designed to operate in rugged environments such as those downstream the power turbine 26, is disclosed in the assignee's U.S. Pat. No. 5,050,692.

Additional efficiencies are realized by using the compressor 46 to supply pressurized air to the SOFC 14. Eliminated is the need for noisy, bulky fans to blow air into the SOFC 14. Additionally, the compressor 46 supplies air to the SOFC 14 at a much higher density than would fans blowing air at ambient pressure. Supplying a greater amount of air per unit volume increases the efficiency of the SOFC 14 and allows a smaller, lighter SOFC 14 to be used.

Additional efficiencies are realized by supplying the exhaust air from the oxidant outlet 20 directly to the combustor 24. Heat is not removed from the exhaust air, and the removed heat is not wasted. Instead, the waste heat in the exhaust air is utilized by the combustor 24. Additionally, the need for a heat exchanger for cooling the SOFC exhaust air is eliminated. Supplying the exhaust air directly to the combustor 24 also makes the combustor 24 more fuel-efficient since less fuel is required by the combustor to raise the temperature of the air.

Another efficiency is realized by supplying the uncombusted fuel and byproducts from the fuel outlet 22 of the SOFC 14 directly to the combustor 24. The unreacted fuel and byproducts are mixed with air within the combustor 24 and ignited. No additional equipment is required for disposing of the byproducts and unreacted fuel.

Yet another efficiency is realized through the use of a partial oxidation reformer 50. The reformer 50 mixes the hydrocarbon fuel with heated air and partially combusts or oxidizes the mixture. One of the byproducts of the partial combustion, hydrogen, is supplied to the fuel inlet 18 of the SOFC 14. Such use of the reformer 50 allows a single fuel delivery system to supply a fuel such as jet fuel or diesel fuel to both the turbomachine 12 and the SOFC 14. Additionally, the reformer 50 uses the heated air supplied by the turbomachine 12, thereby eliminating the need for a separate heat exchanger.

Another efficiency is realized by operating the electrical machine 28 as a motor during startup of the turbomachine 12. Conventional motoring circuitry 52 such as commutation logic, an inverter and sensors generates an excitation current for the stator windings of the electrical machine 28. A battery provides power for the excitation current. Eliminated is the need for a separate starter motor for the compressor 46.

Still another efficiency is realized by directly driving the compressor 46, the power turbine 26 and the electrical machine 28 with a common shaft 54, provided that the rotor of the electrical machine 28 is designed for high speed operation. This eliminates the need for a gearbox for driving the electrical machine 28 and the compressor 46.

If the recuperator 48 cannot transfer sufficient heat to the pressurized air to raise the temperature of pressurized air to the operating temperature of the SOFC 14, the air can be further heated by first and second heat exchangers 56 and 58. The first heat exchanger 56 transfers heat from the hydrogen fuel leaving the reformer 50, and the second heat exchanger 58 transfers heat from exhaust air leaving the oxidant outlet 20 of the SOFC 14.

Figure 2:
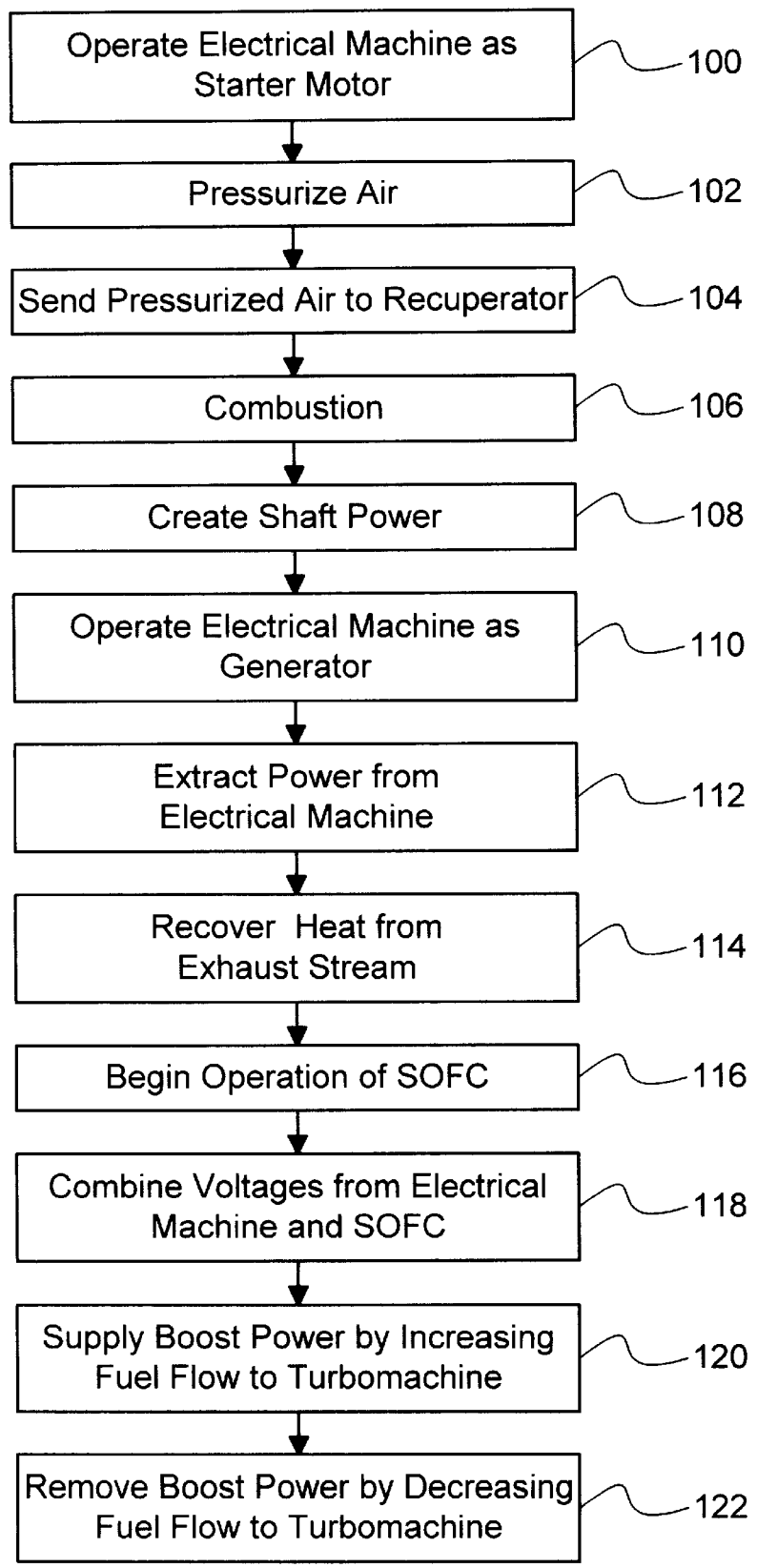
FIG. 2 is a flowchart of a method of operating the hybrid electrical power system of FIG. 1.

FIG. 2 shows a method of operating the hybrid electrical power system 10. Power generation begins by applying an excitation current to the field windings of the electrical machine 28 (100). The excitation current causes the electrical machine 28 to function as a starter motor and turn the common shaft 54. This causes ambient air to be drawn through the compressor 46 and pressurized (step 102). The pressurized air is ducted through the recuperator 48 to the SOFC 14 (step 104), but the temperature of the pressurized air is not increased because the recuperator 48 and SOFC 14 are still at ambient temperature. The pressurized air is supplied to the combustor 24, where it is mixed with fuel and ignited (step 106). Hot expanding gas from the combustor 24 is expanded in the power turbine 26 to create shaft power (step 108).

Once the turbomachine 12 becomes operational and the motoring function is no longer needed, the excitation current is removed, and the electrical machine 28 is operated as an electrical generator (step 110). Only the electrical machine 28 contributes electrical power (step 112). The SOFC 14 is not yet connected to the combiner 34.

In the meantime, the power turbine exhaust stream leaving the power turbine 26 flows through the recuperator 48, and eventually increases the temperature of the pressurized air to near that of the power turbine exhaust stream (step 114). Once the pressurized air reaches the operating temperature of the SOFC 14, the SOFC fuel valve 42 is opened, hydrogen gas is supplied to the SOFC fuel inlet 18 and the SOFC 14 begins generating electricity (step 116). The SOFC 14 is connected to the combiner 34, whereby both the turbomachine 12 and the SOFC 14 contribute electrical power (step 118).

When boost power is needed, the control 44 commands the turbomachine fuel valve 30 to increase the flow of fuel to the combustor 24 (step 120). Output voltage Vout of the electrical machine 28 is increased. When the boost power is no longer needed, the control 44 commands the turbomachine fuel valve 30 to decrease the flow of fuel to the combustor 24 (step 122).

Thus disclosed is a hybrid electrical power system that integrates a solid oxide fuel cell and a turbomachine in a manner that increases the efficiencies of both the solid oxide fuel cell and the turbomachine. Waste heat that would otherwise not be used by the solid oxide fuel cell is used by the turbomachine. Waste heat that would otherwise not be used by the turbomachine is used by the solid oxide fuel cell. Additionally, fans and heat exchangers normally required for operation of a standalone solid oxide fuel cell are eliminated.

The hybrid electrical power system can be used in commercial power generators, emergency power supplies and other stationary devices. However, because the hybrid electrical power supply is light, compact and highly efficient, it is especially attractive for ground vehicles, ships, portable generators, electric vehicles, and other portable systems. The hybrid electrical power system can also provide boost power to these systems, a feature that a solid oxide fuel cell alone cannot provide.

We claim:

1. An electrical power system comprising:
   a solid oxide fuel cell;
   a turbomachine including an electrical machine;
   a valve for regulating a flow of fuel to the turbomachine; and
   a control for commanding the valve to increase the flow of fuel in response to a request for boost power and thereby cause the turbomachine to supply the requested boost power.

2. The system of claim 1, further comprising means for combining output power from the solid oxide fuel cell and the turbomachine.

3. The system of claim 1, wherein the turbomachine further includes a compressor, and wherein ambient air is pressurized by the compressor and supplied to an oxidant inlet of the solid oxide fuel cell.

4. The system of claim 1, wherein the turbomachine further includes a power turbine and means for recuperating heat from a power turbine exhaust stream exiting from the power turbine while the turbomachine is being operated, and wherein an oxidant inlet of the solid oxide fuel cell is supplied with air that is heated by the recuperating means.

5. The system of claim 4, further comprising a reformer for partially oxidizing a hydrocarbon fuel to produce a reformed fuel for the solid oxide fuel cell, wherein some of the air heated by the recuperating means is supplied to the reformer.

6. The system of claim 5, further comprising a heat exchanger for transferring heat from the reformed fuel to the air that is supplied to the oxidant inlet of the solid oxide fuel cell.

7. The system of claim 1, further comprising a heat exchanger for transferring heat from exhaust air of the solid oxide fuel cell to the air that is supplied to an oxidant inlet of the solid oxide fuel cell.

8. The system of claim 1, wherein the turbomachine further includes a combustor, and wherein uncombusted fuel from the solid oxide fuel cell is supplied to the combustor.

9. The system of claim 1, wherein the turbomachine further includes a compressor and a power turbine, wherein the compressor, the power turbine and the electrical machine are directly driven by a common shaft.

10. The system of claim 1, wherein the turbomachine further includes a combustor, and wherein exhaust air from the solid oxide fuel cell is supplied to the combustor.

11. The system of claim 1 wherein the turbomachine further includes
    a power turbine and a recuperator located downstream the power turbine, a power turbine exhaust stream exiting from the power turbine while the turbine engine is being operated, the recuperator transferring heat from the power turbine exhaust stream to air compressed by the compressor;
    and wherein the system further includes a partial oxidation reformer for generating fuel for the solid oxide fuel cell;
    means for directing a first portion of the compressed air heated by the recuperator to the reformer, whereby the first portion is used by the reformer to generate the fuel; and
    means for directing a second portion of the compressed air heated by the recuperator to the oxidant inlet of the fuel cell.

12. A method of operating a solid oxide fuel cell and a turbomachine, the method comprising the steps of:
    operating the solid oxide fuel cell;
    operating the turbomachine;
    combining output voltages of the solid oxide fuel cell and the turbomachine; and
    increasing fuel flow to the turbomachine in response to a request for boost power, whereby the turbomachine provides the requested boost power.

13. The method of claim 12, further comprising the step of utilizing waste from the turbomachine for operation of the solid oxide fuel cell.

14. The method of claim 13, the solid oxide fuel cell including an oxidant inlet, the turbomachine further including a power turbine, wherein the step of utilizing the waste from the turbomachine includes the steps of heating a stream of air with a power turbine exhaust stream exiting from the power turbine while the turbomachine is being operated; and supplying the heated air to the oxidant inlet of the solid oxide fuel cell.

15. The method of claim 12, the solid oxide fuel cell including an oxidant inlet and an oxidant outlet, wherein the steps of operating the solid oxide fuel cell and the turbomachine include the steps of using the turbomachine to pressurize ambient air; supplying the pressurized air to the oxidant inlet; and igniting a mixture of fuel and air supplied from the oxidant outlet.

16. The method of claim 12, further comprising the step of utilizing waste from the solid oxide fuel cell for operation of the turbomachine.

17. The method of claim 16, wherein the step of utilizing the waste from the solid oxide fuel cell includes the steps of mixing air with uncombusted fuel and byproducts from the solid oxide fuel cell; and igniting the mixture to produce shaft power in the turbomachine.

18. The method of claim 16, wherein the step of utilizing the waste from the solid oxide fuel cell includes the step of mixing fuel with exhaust air from the solid oxide fuel cell; and igniting the mixture to produce shaft power in the turbomachine.

19. The method of claim 12, the solid oxide fuel cell including an oxidant inlet and an oxidant outlet, wherein the method further comprises the step of transferring heat from the air leaving the oxidant outlet to air entering the oxidant inlet.

20. The method of claim 12, the solid oxide fuel cell having a fuel inlet and an oxidant inlet, wherein the step of operating the solid oxide fuel cell includes the steps of reforming a hydrocarbon fuel, supplying the reformed fuel to the fuel inlet of the solid oxide fuel cell, and transferring heat from the reformed fuel to air entering the oxidant inlet of the solid oxide fuel cell.

* * * * *